N. W. DALTON.
PROPELLER THRUST REGISTER FOR AIRCRAFT.
APPLICATION FILED JUNE 14, 1916.
1,316,281. Patented Sept. 16, 1919.
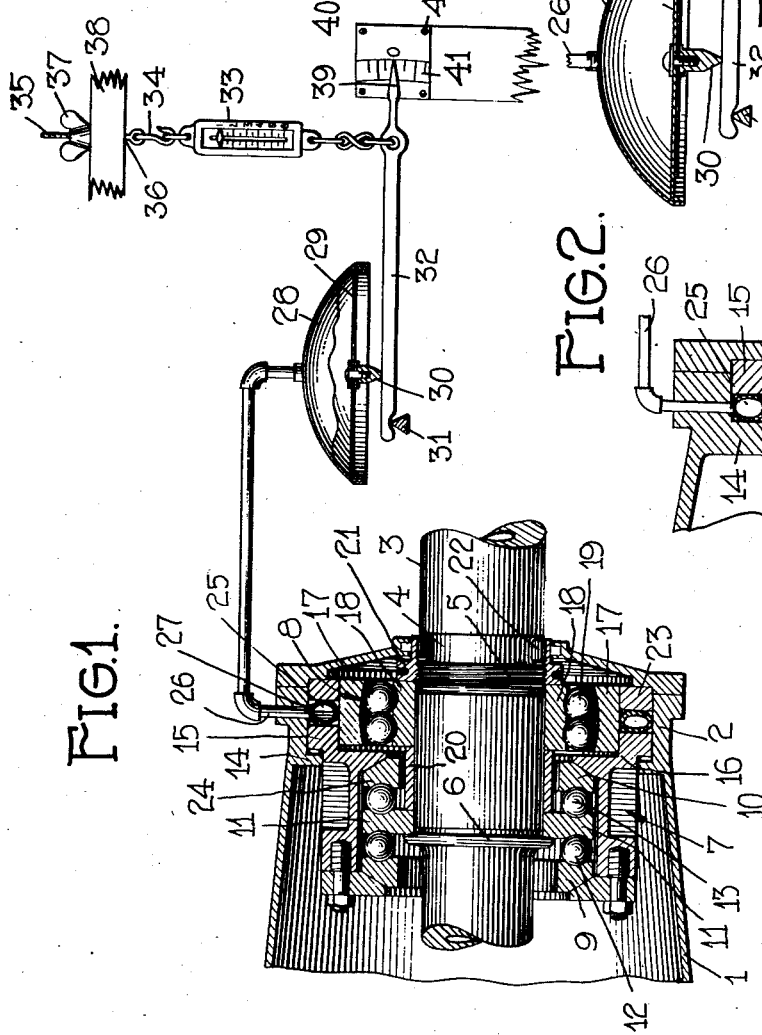
Inventor
NELSON W. DALTON.
By
Attorney

UNITED STATES PATENT OFFICE.

NELSON W. DALTON, OF BUFFALO, NEW YORK, ASSIGNOR TO CURTISS AEROPLANE AND MOTOR CORPORATION, A CORPORATION OF NEW YORK.

PROPELLER-THRUST REGISTER FOR AIRCRAFT.

1,316,281.     Specification of Letters Patent.     Patented Sept. 16, 1919.

Application filed June 14, 1916. Serial No. 103,644.

*To all whom it may concern:*

Be it known that I, NELSON W. DALTON, a citizen of the United States, residing at Buffalo, in the county of Erie and State of New York, have invented certain new and useful Improvements in Propeller-Thrust Registers for Aircraft, of which the following is a specification.

My invention relates generally to propeller thrust registers for aircraft and more particularly to that type of register wherein fluid pressure is utilized to transfer thrust variations to indicator mechanism.

Prior to the conception of my device, propeller thrust has been found either by the static method, which contemplates the anchoring of a movable fuselage and engine to a rigid base, while, between the base and fuselage a recorder is attached which indicates the thrust exerted by the propeller when operating, or by spring compression mechanism actuated by movement of the propeller shaft relative to its bearings. The first of the above methods is objectionable because frictional resistance between moving parts precludes the attainment of accurate results and because it falls short of providing for the greatest need, namely an indicator of propeller thrust during actual flight. The second of the above methods depends primarily upon metallic spring reaction, the efficiency of which may easily be impaired by varied spring temper due to heat or other cause. This device also contemplates the use of fluid as a volumetric measuring means, that is, transference by spring compression of a certain quantity of fluid from the interior of the compression ring to a measuring apparatus similar to a thermometer. Another objectionable feature about this second device is that no provision is made against inaccuracy due to varying indicated pressure caused by increased or decreased fluid volume due to rise or fall in temperature or atmospheric pressure.

My invention is designed to overcome the objectionable features heretofore attending devices of this character and it, therefore, has for one of its objects the provision of a fluid pressure regulator whose reactionary force is due to fluid under pressure, as distinguished from metallic spring reaction, thereby, eliminating to a great extent contractile variability. Another object of my invention is to provide a fluid pressure, transferring medium operating upon the fundamental principle of equal pressure transmission throughout a mass of fluid at rest. And a still further object of my invention is to provide a thrust register which has the same degree of utility during flight as upon the ground. My invention also provides a means for compensating for variation in temperature and atmospheric pressure, thereby insuring an accurate indication of thrust. Moreover, my invention contemplates an indicator mechanism which may be used for the smallest as well as the greatest thrust forces and which may be regulated by the hand of the operator.

To these and other ends, my invention consists in the combination, construction and arrangement of parts described hereinafter and pointed out in the claims.

One embodiment of my invention is represented by way of example in the accompanying drawings, wherein:

Figure 1 illustrates a side elevation of my device with a portion thereof in section;

Fig. 2 is a modification adapted for use with a pusher propeller;

Fig. 3 is a modification of my diaphragm.

Like numbers designate like or similar parts.

In order to clearly illustrate the practical application of my invention, I have shown it as operating in connection with an improved form of combined radial and axial thrust bearing disposed in the crank case of an aeronautical motor. In the device above referred to, the numeral 1 designates a prolongation of the crank case of an aeronautical motor having an enlargement 2 formed on the outer end thereof. The thrust bearings are housed within the said prolongation 1 and are seated within the enlargements 2 and are used in connection with the crank shaft 3 which is provided with an annular groove or cutaway portion 4 adjacent screw threads 5, and an annular flange 6 positioned some distance in the rear of the said screw threads.

The general construction of the radial and axial thrust bearing comprises an axial thrust bearing generally designated as 7 and a radial thrust bearing as 8. The axial thrust bearing 7 includes outer bearing rings 9 and 10 and an intermediate bearing ring 11. Between the bearing rings 9 and 11 are a series of ball bearings 12 and between the bearing rings 10 and 11 are a second series of ball bearings 13. Furthermore, the intermediate bearing ring 11 engages with the annular flange 6 of the crank shaft and consequently any forward movement of the crank shaft will be immediately transferred to the intermediate bearing ring 11 and from thence to the axial thrust bearing as an entirety. In order to prevent excess movement of the axial thrust bearing, I provide an annular shoulder 14 upon the enlargement 2 adapted to engage a co-acting annular shoulder 15 upon the sleeve 16.

The radial thrust bearing member 8 comprises upper and lower sections 17 and 18 respectively and are separated by ball bearings 19. Between the intermediate bearing ring 11 and the radial thrust bearing 8 is located a bearing spacer 20 designed to establish communication therebetween. The nut lock 21 having an anchor or lug portion 22 engages the radial thrust bearing 8 to cooperate with the annular shaft flange 6 to prevent axial movement of the thrust bearings independent of the crank shaft. In spaced relationship to the shoulder 15 of the sleeve 16 and operating between the radial bearing member 8 and the crank case enlargement 2 is a bearing ring 23 adapted in conjunction with flange 15 to receive and transmit radial thrust from the said radial bearing member 8. I desire it to be understood clearly that my invention does not reside in the particular mechanism accomplishing the general functions of the device set forth in the above description which has been given in a most general way to clearly illustrate the actual working arrangement of my invention when assembled, but in the combination of other elements therewith.

In combining my device with the above described mechanism, I have modified the said mechanism as usually built in two ways—first by spacing the annular shoulder 14 from the shoulder 15 and second by placing the annular abutment 24 in spaced relation to the radial thrust member 8. This allows for axial movement of the thrust bearings. I provide an annular hollow tube member 25 which is slightly smaller than the space between the members 23 and 15 and is formed with walls which are very thin and flexible so that any distortion due to change in volume of the liquid contained therein will not produce an appreciable change in the internal pressure, thus eliminating any corrections necessitated by change in temperature or barometric pressure. The tube member 25 is constructed with an oval cross sectional conformation. By thus shaping the tube, I increase the volumetric change of fluid within it with less distortion of its walls. Through an opening or bore in the enlargement 2, I attach a connection 26 which taps the hollow tube as shown at 27. On the opposite end of the connection 27, I provide a bell 28 carrying a diaphragm 29 to which is secured a point 30. It has been found that the diaphragm 29 has a tendency to bow when subjected to great fluid pressure. I, therefore, provide a plate 29$^A$ of slightly less diameter than the diaphragm. This plate is illustrated in Fig. 3. I secure my plate 29$^A$ to the diaphragm 29 by a rivet driven through the center or by the same means used in attaching the point 30. When the pressure increases within the bell, the plate prevents undue distortion of the diaphragm although it in no way hinders the operation of my invention. Upon the knife edge 31 supported by some portion of the fuselage (not shown) is a lever bar 32, upon the upper portion of which the point 30 contacts. The moments of force coincident with the action of members 31 and 30 are balanced on the opposite end of the lever bar 32 by attachment to the spring balance or sliding scale 33 engaging a hook 34 attached to a screw threaded regulating or adjustment shaft 35 operated by the thumb screw 37 and carried within a vertical bore formed in some portion of the fuselage, a section of which is shown at 38. The arrow 39 of the pointer 32 extends past the peripheral edge of a post 40 having a scale 41 secured in any suitable manner thereto as at 42. A zero point on the scale is illustrated in the drawings and it is at this point that arrow head 39 should normally rest as will be hereinafter more specifically pointed out and described.

Before the tube 25, connection 26, bell 28 and diaphragm 29 are assembled and arranged in permanent form, the communicating hollow portions of each are filled to normal capacity with some fluid of medium viscosity such as kerosene, which has a low freezing and comparatively high boiling point. After filling, all joints are made tight by hermetically sealing if possible, so that no escape of the liquid can take place even under high pressure. Attention is directed to the fact that the arrangement of tube, connection and bell above described, parallels to some degree the essential construction of a hydraulic press. According to this principle, whatever pressure is exerted upon the fluid in tube 25 will be transferred and exerted everywhere against the walls and diaphragm of the bell 28. The resultant downward force upon the lever bar 32 will accordingly be sufficient to impart motion thereto which will in turn actuate the spring balance 33 and cause the arrow head to describe an arc upon the scale 41.

Particular attention is directed to the fact that my device automatically compensates for contraction and expansion of the fluid or of the members containing it due to variations in temperature or atmospheric pressure. The bearing 7 is axially movable within the crank case and when, therefore, the fluid contracts or expands, a compensating movement will be transmitted to the sleeve 16, for the tube 25 is of such resilient nature that it will readily adapt itself to any reasonable change of fluid volume due to atmospheric or temperature variations.

The operation of my invention is as follows: Suppose, for example that four hundred and forty pounds tractional thrust be exerted by the shaft 3; it will move forward actuating the intermediate bearing 11 in the same direction, and consequently imparting like movement to the sleeve 16 through the medium of ball bearings 10, bearing ring 9 and abutment 24. Any forward movement of the sleeve 16 from the normal will tend to compress the walls of the tube 25 decreasing the volume and consequently increasing the pressure of the fluid therein. As pressure is transmitted equally in all directions throughout a mass of fluid at rest, or similarly, as the pressure at any point is increased, it is increased throughout the fluid mass by the same amount, the diaphragm carried by the bell 28 will be forced downwardly actuating the lever bar and consequently the spring balance 22 and arrow head 39 through the medium of the plunger 30. The balance and scale can be so graduated as to register the exact thrust imparted by the shaft 3, which in this instance will be four hundred and forty pounds. Attention is particularly called to the fact that the fluid within the tube 25 acts as a cushion for the sleeve 16 and consequently the axial thrust bearing 7. Upon exertion of axial thrust, the lever 32 moves downward from the 0 point on scale 41 and a thrust is registered on scale 33. Regulating shaft 35 is then adjusted by means of the thumb screw 37, until the arrow head 39 of the lever bar 32 is at the zero point on the scale 41. By positioning the arrow head at the zero point, the liquid volume in the tube 25 is increased and the sleeve 16 and consequently the shaft is moved axially a slight amount to accommodate the variation. Upon completing this adjustment, the indicated thrust on the scale 33 when the motor is operated is correct. If the adjustment is made when the shaft is stationary, friction may cause a slight indication on scale 33, but this static friction disappears under operating conditions.

In the modification illustrated in Fig. 2, I have shown the sleeve 16 extended to form a bearing for the radial thrust bearing and to dispose the shoulder 15 in the position formerly occupied by bearing ring 23. Consequently, by enlarging shoulder 14, I form a housing for the tube 25 as illustrated. When movement is imparted to the sleeve 16 by action of a pusher propeller, the tube is compressed by the shoulder 15 and the amount of thrust is registered in the same manner as is described in connection with the original embodiment of my invention.

While in the foregoing, there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. The combination with a shaft and thrust bearing, of a thrust register comprising a pressure indicator and an annular fluid containing tube engageable with said bearing, said tube being compressible to operate the indicator through fluid pressure.

2. The combination with a shaft and thrust bearing, of a thrust register comprising a pressure indicator, and means acted upon directly by the thrust bearing for operating said indicator through fluid pressure.

3. The combination with a shaft and thrust bearing, of a thrust register comprising a pressure indicator, and a fluid containing tube in engagement with and compressible by relative movement of the thrust bearing parts for operating said indicator through fluid pressure.

4. The combination with a shaft and thrust bearing, of a thrust register comprising a pressure indicator, and trapped fluid means for operating said indicator through fluid pressure, said means being in engagement with a movable bearing part.

5. The combination with a shaft, a thrust bearing and an abutment, of a thrust register comprising a fluid containing member adapted to be acted upon by said thrust bearing and said abutment to operate said register through fluid pressure.

6. The combination with a shaft, a thrust bearing and an abutment, of a thrust register comprising a fluid containing member disposed between said thrust bearing and said abutment and adapted to be acted upon by said bearing to operate said register by fluid pressure.

7. The combination with a shaft and thrust bearing of a thrust register comprising an annular fluid containing member having thin and flexible walls adapted to be compressed by said bearing to operate said register through fluid pressure.

8. The combination with a shaft and thrust bearing, of a thrust register comprising a pressure indicator, means for operating said indicator through fluid pressure, and means compensating for inaccuracies due to temperature changes without varying the quantity of fluid used.

9. The combination with a shaft and thrust bearing, of a fluid container including in its ensemble a diaphragm, said container being located remote from the bearing, a fluid containing tube having fluid communication with the container, said tube being in direct contact with the bearing, and a pressure indicator connecting with and adapted to be operated by and according to the force exerted upon the diaphragm by fluid pressure.

10. The combination with a shaft and thrust bearing, of a thrust register comprising a pressure indicator, means without said bearing for operating the indicator through fluid pressure, and means within said bearing for applying fluid pressure to said first named means.

11. The combination with a shaft and thrust bearing, of a thrust register comprising a pressure indicator, a fluid container, means in direct contact with said bearing and open to said container, the fluid pressure within the container being determined by the compression of said means by contact with said bearing, and means movable through distortion of the diaphragm to actuate the indicator with a force proportional to the force exerted on the diaphragm.

12. The combination with a shaft and thrust bearing, of a thrust register comprising a pressure indicator, a distortable diaphragm, means acted on by the thrust bearing parts for exerting fluid pressure upon the diaphragm, mechanism acted on by the diaphragm when distorted for actuating the pressure indicator with a force proportional to the displacement of the diaphragm, and means upon the diaphragm for limiting its distortion.

13. The combination with a shaft and thrust bearing, of a thrust register comprising a pressure indicator, a diaphragm movable under fluid pressure to operate the indicator, and a fluid container carried by and between related parts of the thrust bearing, said container having fluid communication with the diaphragm for actuating it.

14. In a device for measuring the tractional effort of a propeller, the combination with the shaft and thrust bearing, of an abutment fixed relatively to the thrust bearing, a fluid containing tube inclosed between said abutment and said bearing, a pressure indicator, and means for operating said indicator through fluid pressure within said tube and according to the displacement of its walls under compression.

15. In a device for measuring the tractional effort of a propeller, the combination with the thrust bearing for the propeller shaft, of an abutment, a fluid containing tube mounted between said abutment and said bearing, the walls of the tube being compressible under the action of said bearing, a pressure indicator, means for operating said indicator through fluid pressure, and means compensating for inaccurate indications due to variations in temperature and atmospheric pressure.

16. In a device for measuring the tractional effort of a propeller, the combination with the thrust bearing, of a relatively fixed abutment, a compressible fluid containing member having one of its walls in engagement with said abutment and another of its walls in engagement with said bearing, the container being compressible by movement of said bearing, a pressure indicating device and a connection between the fluid containing member and said device for operating the latter through fluid pressure.

17. In a device for measuring the tractional effort of a propeller, the combination with a thrust bearing for the propeller shaft, of a pressure indicator, a fluid container including in its ensemble a distortable diaphragm, a fluid containing member compressible under the action of said bearing, said fluid containing member and container being in communication, and mechanism movable by displacement of the diaphragm to operate said indicator with a force proportional to the displacement of the diaphragm.

18. In a device for measuring the tractional effort of a propeller, the combination with an element movable axially with the propeller shaft, of a pressure indicator, an abutment fixed relatively to the propeller shaft, a fluid container mounted between said element and said abutment, the container being compressible as the element is moved toward said abutment, and an element movable in proportion to the force exerted by the fluid in the container to operate the indicator.

19. In combination a shaft having axial thrust, a ball thrust bearing therefor having a member fixed against rotation but arranged to partake of axial movement and a complementary abutment therefor, a tubular thrust ring arranged between said complementary parts of the thrust bearing, and a pressure responsive device connected with said tubular thrust ring to measure changes in volume thereof.

20. In combination a shaft having axial thrust, a thrust bearing therefor having a member fixed against rotation but arranged to partake of axial movement and a complementary abutment therefor, a tubular thrust ring arranged between said complementary parts of the thrust bearing, and a pressure responsive device connected with said tubular ring to measure changes in volume thereof.

In testimony whereof I affix my signature.

NELSON W. DALTON.